United States Patent [19]

Kim et al.

[11] Patent Number: 5,486,931
[45] Date of Patent: Jan. 23, 1996

[54] DIGITAL VIDEO SIGNAL RECORDING AND REPRODUCING METHOD AND APPARATUS THEREOF

[75] Inventors: Jong-kuk Kim, Daegu; Kwang-ho Moon, Seoul, both of Rep. of Korea

[73] Assignee: Samsung Electronics Co., Ltd., Kyungki-Do, Rep. of Korea

[21] Appl. No.: 91,128

[22] Filed: Jul. 14, 1993

[30] Foreign Application Priority Data

Jul. 14, 1992 [KR] Rep. of Korea .................... 92-12524

[51] Int. Cl.6 ................................................ H04N 5/76
[52] U.S. Cl. ................................ 358/335; 360/10.1
[58] Field of Search ........................... 358/335, 341, 358/343, 342, 310, 312; 360/10.1; 348/384

[56] References Cited

U.S. PATENT DOCUMENTS

| | | | |
|---|---|---|---|
| 4,613,912 | 9/1986 | Shibata et al. | 360/19.1 |
| 4,910,605 | 3/1990 | Sasaki et al. | 358/310 |
| 5,130,800 | 7/1992 | Johnson et al. | 358/183 |
| 5,132,807 | 7/1992 | Takimoto et al. | 358/335 |
| 5,347,406 | 9/1994 | Chiba et al. | 360/33.1 |

FOREIGN PATENT DOCUMENTS 0505985  9/1992  European Pat. Off. ......... H04N 5/92

*Primary Examiner*—Howard W. Britton
*Assistant Examiner*—Robert Chevalier
*Attorney, Agent, or Firm*—Sughrue, Mion, Zinn, Macpeak & Seas

[57] ABSTRACT

A recording/reproducing method includes helically scanning a first region of a magnetic tape running at a normal speed using several rotary heads, recording a digital data train on several sloped tracks and simultaneously recording single-frame data at N-picture intervals on a second region of the magnetic tape through at least one fixed head, and reproducing the data recorded on the first region during a normal reproduction, while the magnetic tape runs at an N-times speed for variable speed reproduction to reproduce the data recorded on the second region. In a digital VTR, the recording data for the normal recording/reproduction and special recording/reproduction is separately recorded and reproduced on mutually different regions of the magnetic tape. Accordingly, since the processing of the normal recording/reproduction signal is independent from that of the special recording/reproduction signal, the normal-processing design is facilitated due to a greater degree of freedom. Also, an apparatus is adapted to perform the method.

20 Claims, 5 Drawing Sheets

FULL-SCREEN DISPLAY     QUARTER-SCREEN DISPLAY

ID
DIGITAL VIDEO SIGNAL RECORDING AND REPRODUCING METHOD AND APPARATUS THEREOF

FIELD OF THE INVENTION

The present invention relates to a digital video signal recording and reproducing method and apparatus thereof, and more particularly, relates to a digital video signal recording and reproducing method and apparatus thereof for pro, cling an excellent reproduction picture when performing a variable speed reproduction such as a high speed search. The present disclosure is based on the disclosure of Korean Patent Application No. 92-12524 filed Jul. 14, 1992.

Since 1980, home appliance manufacturers have been studying and developing digital video tape recorders (VTRs) for home usage. Such digital VTR systems are for simply recording and reproducing video data by means of compression and high-density recording, and should accomplish an encoding technology which simultaneously achieves high definition, long recording times, variable speed reproduction, and picture editing. However, when video data is compressed for extended duration recording, the compression bit rate is varied according to the complexity of the video. Accordingly, the bit rate should be fixed in units of a sync block, being the minimum unit to satisfy high definition. Therefore, since some data is lost by the fixed bit rate, a completely satisfactory picture cannot be expected. Also, even if the bit rate is fixed to a sync-block unit, when the sync-block data is not totally picked up, hence, the sync block is not reproducible. Accordingly, since the unproducible sync block is generated during a variable speed reproduction in which the rotary head transverses a track, the mosaic phenomenon randomly appears on the screen according to the multiple speed. Thus, the picture quality of the variable speed reproduction screen is less than desirable.

To obtain a sharp picture during variable speed reproduction, a method jumping over tracks has been developed by adopting a dynamic head using a piezoelectric element such as a bimorph cell. According to the present technology level, the method enables reproduction at three to five times normal speed, while reproduction at more than six times the normal speed is impossible. Also, since the dynamic head is expensive and the servo control technology of track jumping requires very high precision, this method is currently used only in special applications such as a broadcast studio applications.

SUMMARY OF THE INVENTION

Therefore, to solve the above problems of the conventional technologies, it is an object of the present invention to provide a digital video signal recording and reproducing method in which, during a variable speed reproduction, a clear picture can be viewed.

It is another object of the present invention to provide a digital video recording and reproducing apparatus which is most adaptable for performing the above digital video recording and reproducing method.

To accomplish the above first-mentioned object of the present invention, there is provided a digital video recording and reproducing method comprising the steps of:

helically scanning a first region of a magnetic tape running at a normal speed, using a plurality of rotary heads;

recording a digital data train on a plurality of sloped tracks, and simultaneously recording a single frame of data at an interval of N pictures on a second region of the magnetic tape, through at least one fixed head: and reproducing the data recorded on the first region during a normal reproduction, while the magnetic tape runs at an N-times speed for a variable speed reproduction to reproduce the data recorded on the second region.

To accomplish the above second-mentioned object of the invention, there is provided a digital video recording and reproducing apparatus comprising:

a plurality of rotary heads for helically scanning a first region of a magnetic tape, at a predetermined rotating speed;

a plurality of fixed heads for lengthwise scanning a second region of the magnetic tape;

a normal recording portion which receives a digital audio/video signal, performs high-efficiency encoding, error correction encoding and channel encoding of the received signal, and supplies the encoded signal to the plurality of rotary heads;

a variable speed recording portion which receives every Nth frame of the digital video signal input to the normal recording portion, performs sub-sampling, high-efficiency encoding and channel division operations to the input signal, performs error correction encoding and channel encoding of the respectively divided channel signals and supplies the encoded and divided signal to the corresponding fixed heads:

a normal reproduction portion which processes the signals picked-up from the first region of the magnetic tape via the plurality of the rotary heads in the manner inverse to that of the recording procedure and restores the processed signals into the original signals, during the normal reproduction; and a variable speed reproduction portion which processes the signals picked-up from the second region of the magnetic tape via the plurality of the fixed heads in the inverse manner to that of the recording procedure and restores the processed signals into the original signals, during the variable speed reproduction.

BRIEF DESCRIPTION OF THE DRAWINGS

The above objects and other advantages of the present invention will become more apparent by describing in detail preferred embodiments of the present invention with reference to the attached drawings in which.

DETAILED DESCRIPTION OF THE PREFERRED EMBODIMENTS

The preferred embodiments of the present invention will be described below with reference to the accompanying drawings.

Figure 1:
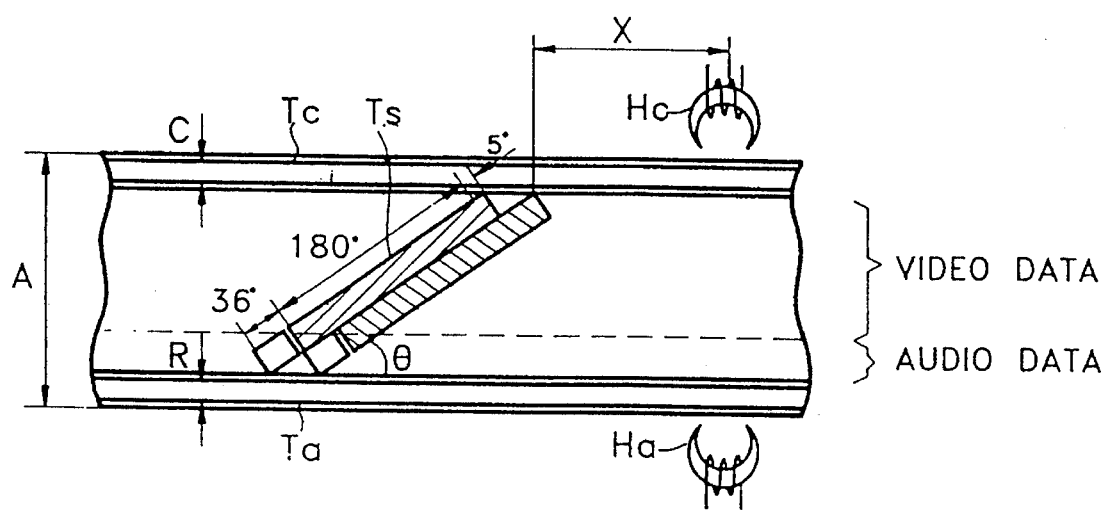
FIG. 1 is a recording pattern diagram showing a conventional helical scan-type 8 mm video tape.

FIG. 1 shows a recording format for a conventional helical scan-type 8 mm video tape. The reference symbol "A" represents the overall width (8 mm) of the video tape, "R" is the dimension (0.6 mm) of an auxiliary audio track Ta, "C" is the dimension (0.6 mm) of a cue track Tc, "X" is the distance (31 mm) along the tape from the 180° scan end location for a rotary drum to the position of audio and cue heads Ha and Hc, and "Ts" is a sloped track divided into audio and video data intervals. Sloped track Ts is inclined by a lead angle θ with respect to the lengthwise direction of the tape. Also in FIG. 1, 36° of the rotary drum scan is allotted for the audio data, while the 5° is for the vertical blanking period.

Figure 2:
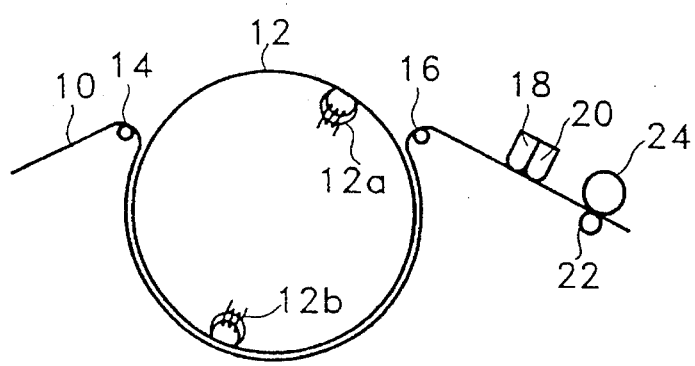
FIG. 2 is a schematic diagram showing a tape running system of a conventional helical scan-type video tape recorder (VTR)

FIG. 2 is a schematic diagram of a tape running system of the general helical scanning rotary head-type digital VTR. In FIG. 2, reference numeral 10 represents a tape, 12 is a rotary drum, 12a and 12b are rotary heads, 14 and 16 are inclined posts, 18 is an erase head assembly, 20 is a cue & audio head assembly, 22 is a capstan shaft, and 24 is a pinch roller. Tape 10 is provided at a constant running velocity $v_T$ by capstan shaft 22 and pinch roller 24 which are rotated by a capstan motor (not shown). Rotary drum 12 is rotated at a constant rotational velocity $v_D$ (i.e., 3600 rpm) by a drum motor (not shown). For instance, assuming that the diameter of the rotary drum is 40 mm, rotary heads 12a and 12b scan the sloped tracks Ts at the speed of 7.536 m/s. Therefore, if a pitch P of sloped track Ts is 10 μm and the angle of inclination θ is 4°88', the tape running velocity can be expressed by the following equation (1).

$$v_T = \frac{P}{\sin\theta} \times N_{Ts} \quad (1)$$

$N_{Ts}$ represents the number of sloped tracks scanned per one second by the rotary head. For example, in the case of a single-frame four-track division method, 30 frames should be displayed on a screen each second. Accordingly, since 120 tracks are scanned per second by the rotary head, tape running velocity $v_T$ becomes 14.106 mm/s. That is, tape 10 is travelled by 14.106 millimeters per second in the lengthwise direction of the tape.

The present invention can record and reproduce the particular reproduction picture information (e.g., trick play or a variable speed reproduction operation) on the audio track Ta and cue track Tc, thereby displaying a clean picture during the special playback operation. Also, since the normal reproduction region is independent from the special reproduction region, the bit rate of the video data to be recorded on the normal reproduction region can be fixed.

Accordingly, the picture quality of the normal reproduction picture is improved and the composition of the data compression and decompression circuitry can be simplified.

Figure 3:
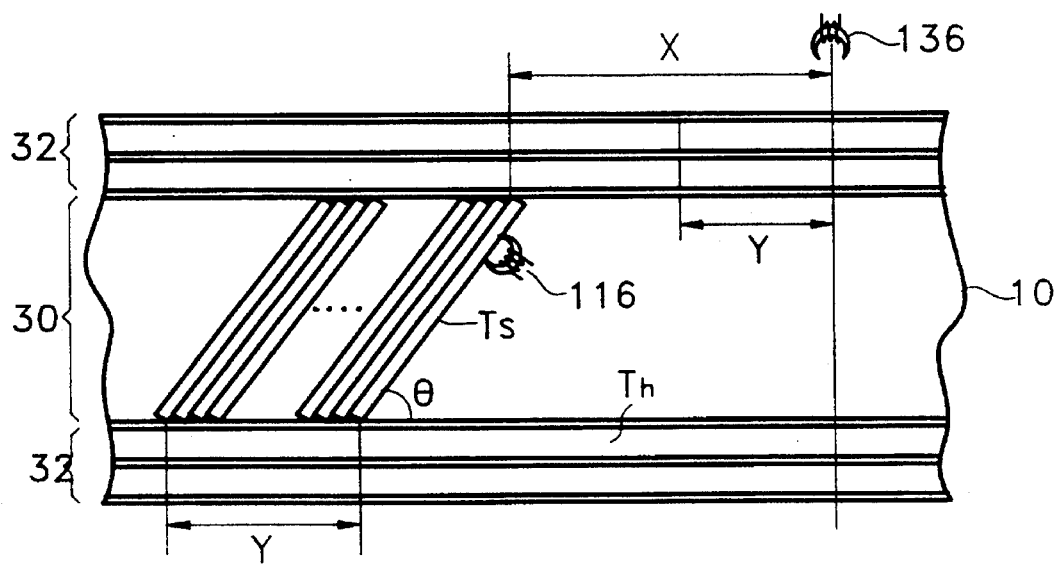
FIG. 3 is a recording pattern diagram of a magnetic tape according to the present invention.

FIG. 3 is a schematic diagram of the recording format of the magnetic tape for the digital video signal recording and reproducing apparatus according to the present invention. In FIG. 3, reference numeral 30 represents a first region for normal recording and playback operations, and reference numeral 32 represents a second region for a special playback such as a high speed search. The first region 30 includes a plurality of sloped tracks Ts on which the digital audio/video information and the tracking pilot signal are overlapped and recorded via the helical scan-type rotary head. The second regions 32 include at least one horizontal track Th on which the special reproduction picture information is recorded via fixed heads 136. Fixed heads 136 are positioned at the distance "X" (same as that of the conventional VTR) from the scanning end of sloped track Ts of rotary heads 116. That is, the position of the fixed heads corresponds to that of the audio & cue head assembly of the conventional VTR. Therefore, when rotary heads 116 scans a quantity N of sloped track Ts of first region 30, an interval "Y" along horizontal track Th of tape 10 is scanned by fixed heads 136. Accordingly, in the present invention, one frame of information is recorded on the interval "Y" of horizontal track Th so as to correspond to a predetermined number of frames at a normal recording speed. For special playback operations, the picture information recorded on the horizontal track is picked up and reproduced via the fixed head, while the tape is travelled at a predetermined playback speed.

Preferred embodiments of the present invention will be described below for the sake of the understanding of the invention.

Figure 4:
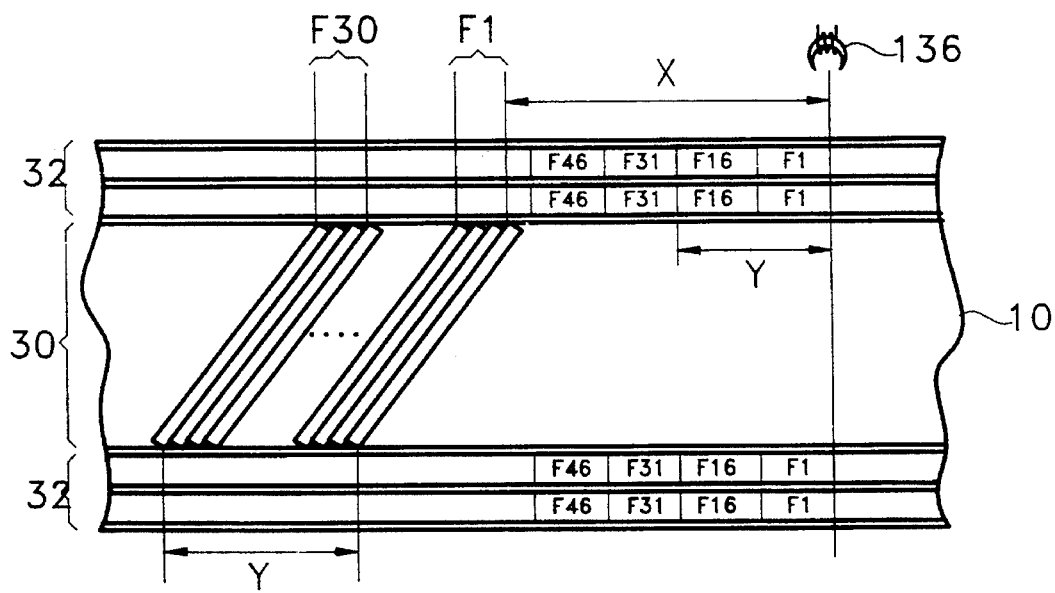
FIG. 4 is a recording pattern diagram of a magnetic tape according to a preferred embodiment of the present invention.

FIG. 4 shows a tape recording format according to one preferred embodiment of the present invention. In this embodiment, one flame of information is divisionally recorded on four sloped tracks at a speed of 30 frames per second, and simultaneously, two frames of information is divisionally recorded on four horizontal tracks. Thus, as shown in FIG. 4, when 30 frames of information F1–F30 is recorded on first region 30 for one second, two frames of information FI–F16 having a fifteen-frame interval is recorded on the interval "Y" of second region 32 for one second.

Figure 5:
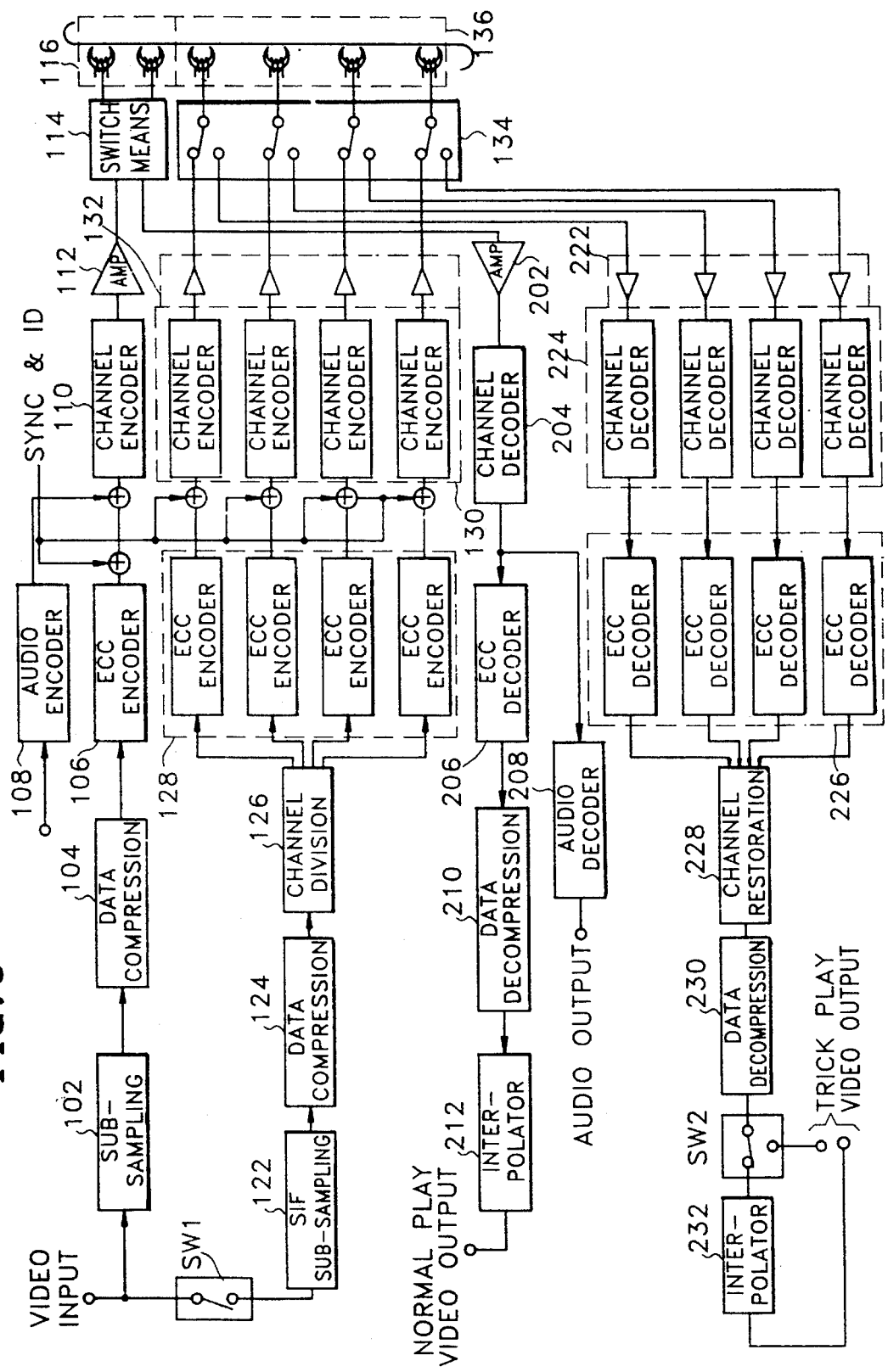
FIG. 5 is block diagram of a recording and reproducing apparatus according to the present invention.

FIG. 5 is block diagram of the recording and reproducing apparatus according to one embodiment of the present invention. The apparatus of the present invention can be categorized into a recorder section and a reproducer section, with the recorder being subdivided into a normal recorder and special recorder and the reproducer likewise being subdivided into a normal reproducer and special reproducer.

The normal recorder comprises sub-sampling circuit 102, data compression circuit 104, error correction encoder 106, audio encoder 108, channel encoder 110 and recording amplifier 11. Meanwhile, the special recorder comprises source input format (SIF) sub-sampling circuit 122, data compression circuit 124, channel division circuit (or multiplexer) 126, four error correction encoders 128, four channel encoders 130, and four channel recording amplifiers 132.

The normal reproducer comprises reproduction amplifier 202, channel decoder 204, error correction decoder 206, audio decoder 208, data decompression circuit 210 and interpolator 212. Meanwhile, the special reproducer comprises four reproduction amplifiers 222, four channel decoders 224, four error correction decoders 226, channel restoration circuit (or demultiplexer) 228, data decompression circuit 230 and interpolator 232.

The normal recorder and the normal reproducer are combined with a pair of rotary heads 116 via switch 114. The special recorder and the special reproducer are combined with four fixed heads via switch 134. The special recorder inputs one frame of information by an interval of fifteen frames via switch SW1. The special reproducer selects the size of the screen display for the reproduced picture via switch SW2.

Figure 6:
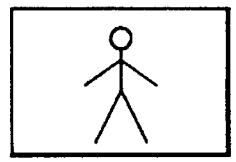
FIG. 6 is a view for explaining displayed picture size when a special reproduction is performed according to the present invention.
Figure 6:
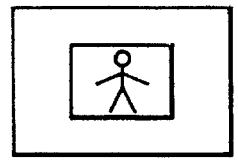

As shown in FIG. 6, the reproduced picture can be displayed as a full-sized screen via interpolator 232; without passing through the interpolator, the reproduced picture is displayed on a quarter-sized screen. Under these conditions, picture quality is partially sacrificed when the SIF sub-sampled picture is interpolated as a full screen display, and a quarter screen display is somewhat small but produces better picture quality. In the peripheral region of the quarter-screen display, the background is processed as a blue screen or the like.

Figure 7:
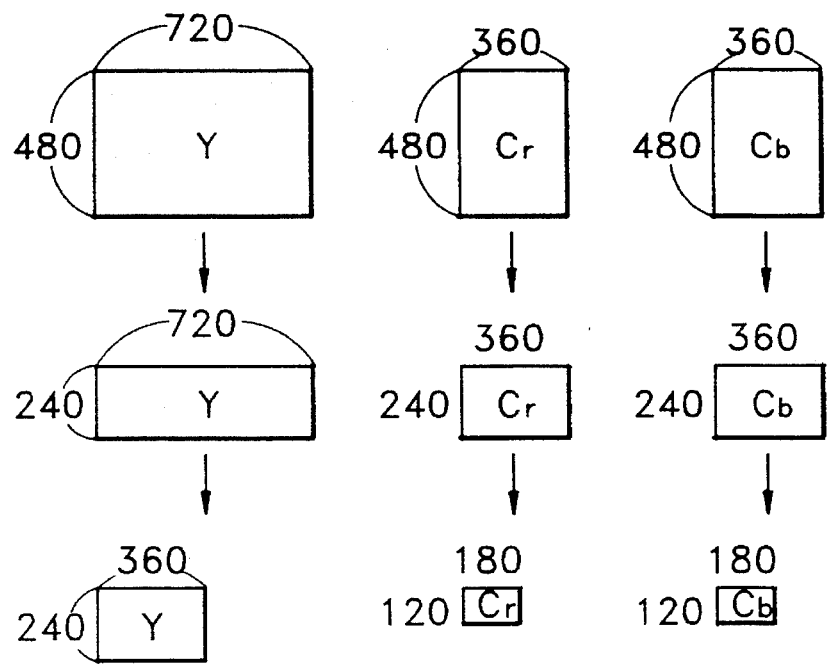
FIG. 7 is a view for explaining a sub-sampling operation when special recording is performed according to the present invention.

In the above apparatus, the video input is a component signal having the CCIR 601 format in which the ratio of Y:Cr:Cb=4:2:2, as can be seen in FIG. 7. The luminanee signal Y is composed of 480×720 pixels, and each color difference signal is 480×360 pixels.

Referring to FIGS. 5, 6 and 7, sub-sampling circuit 102 receives 4:2:2 component signal and sub-samples the color difference signals Cr and Cb, so as to be converted into a 4:1:1 component signal. Data compressor 104 receives the converted signal, compresses the data in a predetermined compression ratio, encodes the compressed data, and outputs the encoded data. The compression encoding method uses a well-known orthogonal transform coding, predictive coding or vector quantization; intraframe or interframe coding is also possible.

It should be noted that for the above special reproduction function, the conventional problem has persisted in that controlling so as to fix the amount of bits of the sync block as the minimum recording unit is difficult; and for this reason, picture quality has suffered greatly. However, since the special reproduction data is separately processed according to the present invention, the amount of bits does not need to be strictly controlled. Accordingly, since the compression algorithm becomes simplified, a simple compression circuit can be constructed.

As the bit rate may be fixed in units of fifteen frames or thirty frames in the present invention, the picture quality of the reproduced picture during the normal reproduction is much improved compared with the conventional case. Error correction encoder 106 receives the encoded data and encodes the received data by a well-known error correction encoding algorithm, to output the data added in sync-block units to the parity code. A two-byte sync code (SYNC) and two-byte identification code (ID) are added to the data of the sync block. The data output from audio encoder 108 is processed therein by such digital modulation methods as eight-to-eight, eight-to-fourteen or quadrature-amplitude modulation. Recording amplifier 112 amplifies the modulated data and supplies the amplified data to rotary head 116 via switch 114. If the final recording bit rate is 25 Mbps and the rotary drum having a diameter of 40 mm is rotated at 3600 rpm, the rotary speed of rotary head 116 is 7.536 m/s and the maximum recording frequency becomes 12.5 MHz.

The special recorder processes the information corresponding to thirty frames which is processed for one second in the normal recorder, and records the processed data on the interval "Y" of the horizontal track via fixed heads 136. However, since the interval "Y" is a very small region compared with the normal recording region, the information corresponding to the entire thirty frames cannot be recorded, and one frame of information can be recorded by intervals of fifteen frames or thirty frames. This embodiment is described with respect to one frame of information being recorded by an interval of fifteen frames. Therefore, as shown in FIG. 4, the information corresponding to frames F1 and F16 among the thirty frames is compressed and recorded on the interval "Y." Switch means SW1 is turned on for a one-frame period every other 15-frame interval, and is turned off for the other periods. As shown in FIG. 7, SIF sub-sampling means 122 sub-samples the 4:2:2 component signal, and converts the luminance signal Y into a signal of 240×360 pixels and each color difference signal Cr and Cb into one of 120×180 pixels. This is for reducing the data amount through the sub-sampling, since the amount of bits which can be recorded on the interval "Y" is much less than that needed for normal recording. Since data compression circuit 124 has no interframe correlation, only the intraframe encoding method is applicable. The bit amount is constantly controlled in frame units, using a well-known compression encoding method. A data compression ratio CP is represented by the following equation (2).

$$CP = \frac{(B+C)\lambda}{2Hv_T} \quad (2)$$

A reference symbol B represents a bit rate per each channel, C is a parity bit rate $\lambda$ is the recording wavelength of a fixed head, H is the number of fixed heads, and $v_T$ is the relative speed of the tape with respect to a fixed head.

Using the above equation (2) and assuming that a total bit rate of two SIF sub-sampled frames is 2025 kbps, the parity bit rate is 20% of the total bit rate, $v$ is 0.6 μm, and $\lambda_T$ is 14.106 mm/s, the compression ratio CP is calculated as follows:

$$\begin{aligned} CP &= \frac{2,025 \times 1.2 \times 0.6}{14.106 \times 8} \\ &= 12.9 \end{aligned}$$

Therefore, the bit rate after compression is 155.77 kbps (2025 kbps/13). Accordingly, in this embodiment, one frame of SIF information should be always constantly compressed as 77.88 kbps.

The above compression ratio has been calculated on the basis of a standard-play mode. However, in case of a long-play mode, since the speed of the drum rotation is 1800 rpm, the number of tracks per frame is reduced from four to two, and accordingly, the interval "Y" is halved. Thus, the compression ratio should be double for the long-play mode. The relationship between the data compression ratio and certain parameters for the special recorder is as follows:

i) Sloped track pitch P: As P increases, the interval "Y" becomes longer. (Accordingly, the burden to the compression ratio is reduced and the normal recording time is shortened.)

ii) Recording wavelength $\lambda$: As $\lambda$ grows shorter, the recording density increases. (The present level of the technology is about 0.6 μm.).

iii) Number of fixed heads H: As H increases, the compression ratio is reduced.

As described above, the system according to the present invention is optimally designed based on the data compression CP, P, $\lambda$ and H. The compression ratio calculation should be decided taking costs into consideration along with the widths of both auxiliary tracks.

Channel division circuit 126 divides the compressively encoded data into four channels of data for output. The respectively divided channel data is supplied to the corresponding fixed heads 136 through error correction encoders 128, channel encoders 130 and recording amplifiers 132.

The reproducing system according to the present invention is described below. During normal reproduction, the signal is picked up from a first region of sloped tracks via rotary head 116 and input to the normal reproducer via switch means 114. The signal input to the normal reproducer passes through reproduction amplifier 202 and channel decoder 204, and the channel-decoded video data passes through error correction decoder 206, data decompression circuit 210 and interpolator 212, so as to be reconstructed as an original picture signal and supplied to a display unit. The channel-decoded audio data is restored as an audio signal via audio decoder 208. On the other hand, during special reproduction, the signal is picked up from a second region of horizontal tracks via four fixed heads 136 and input to the special reproducer via switch means 134.

In the present invention, during such special reproduction functions as high-speed searching, the tape speed is increased. In order to accomplish real-time processing even during a high speed reproduction, one frame of information which is simultaneously picked up from four fixed heads 136 should be processed within 1/30th of a second. During this processing, the tape travels 7.053 mm (14.106 mm/2), making the tape speed 211.59 mm/s. With the tape travelling at such a speed, the information is sequentially picked up in the order of F1, F16, F31 . . . , which ultimately performs fifteen-times normal speed reproduction. The special reproducer processes the input signal in the reverse order of that for the special recorder, to reconstruct the original signal having the SIF form. Accordingly, the restored signal is interpolated and converted back into a CCIR 601 format via interpolator 232 to be displayed as a full-sized screen, or is output directly in SIF form to be displayed as a half-sized screen.

Figure 8:
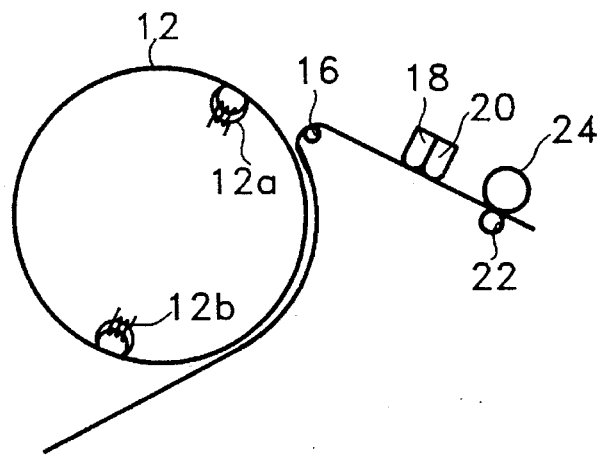
FIG. 8 is a view for explaining a half-loading method when special reproduction is performed according to the present invention.

Also, in the high speed reproduction, besides the full-loading method (FIG. 2), a half-loading method as shown in FIG. 8 can be applied to the tape. The half-loading method is advantageous over the full-loading method in view of the loosening of the tape and its deterioration due to wear.

The frequency characteristics for the recording and reproducing procedure of the fixed heads can be described as follows.

The bit amount which is able to be recorded for a second by a single fixed head is 46.7 Kbits. Accordingly, in case of the fifteen-times speed, the bit rate is 700.5 Kbits (46.7 Kbits×15). Therefore, since the maximum frequency is 0.34 MHz, the frequency characteristic of the fixed head is designed so as to be more than 0.34 MHz.

Figure 9:
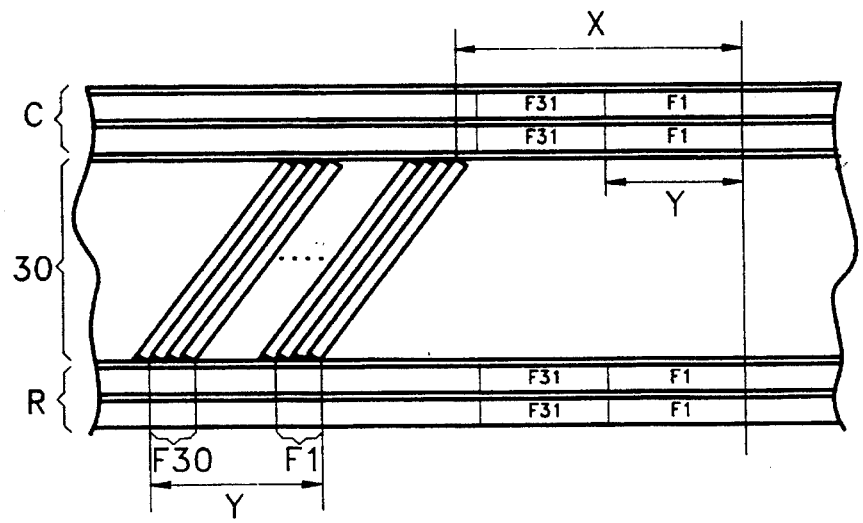
FIG. 9 is a recording pattern diagram of a magnetic tape according to another embodiment of the present invention.

FIG. 9 represents the data recording format of a time when one frame of information is recorded on the interval "Y," that is, the recording format of a time when one frame of information is recorded on an interval "Y" of the horizontal track for the purpose of the special reproduction every other thirty-frame interval. In this case, the data compression ratio becomes 6.5, which halves the compression ratio burden compared with the above-described Y-interval double-frame method. On the other hand, the Y-interval single-frame method has a tape reproduction speed of 423.18 mm (14.106 mm divided by 1/30th of a second). Thus, only 30-times normal speed is possible. Therefore, in this case, the frequency characteristic of the fixed head becomes 0.68 MHz.

Figure 10:
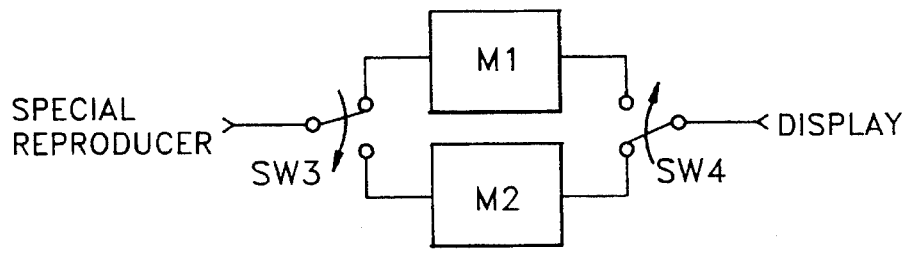
FIG. 10 is a block diagram which represents a video output means for a variable speed reproduction according to the present invention.

FIG. 10 is a block diagram of a video output means for a variable speed reproduction of a recording and reproducing system according to the present invention. The reference symbols M1 and M2 are frame memories, and SW3 and SW4 are switches. Switch SW3 alternately supplies the frame information restored in the special reproducer to frame memories M1 and M2. Switch SW4 performs a switching of frame memories M1 and M2 opposite to that of switch SW3. The supplied frame information is written on frame memories M1 and M2 for a time which is the reciprocal of the product of the number of Y-interval-recorded frames and the speed multiple. Also, the written frame information is repetitively read out from frame memories M1 and M2 by an integer value representing the write time (per second) multiplied by thirty (30/s). For example, using the Y-interval single-frame method (FIG. 9), variable-speed reproduction at the speeds shown in the following Table 1 is possible.

TABLE 1

| Speed multiple | Tape speed (mm/s) | Write time (in seconds) | Read time (in seconds) | Number of read repetitions |
|---|---|---|---|---|
| 1× | 1$v_T$ | 1 | 1/30 | 30 |
| 2× | 2$v_T$ | 1/2 | 1/30 | 15 |
| 3× | 3$v_T$ | 1/3 | 1/30 | 10 |
| 5× | 5$v_T$ | 1/5 | 1/30 | 6 |
| 6× | 6$v_T$ | 1/6 | 1/30 | 5 |
| 10× | 10$v_T$ | 1/10 | 1/30 | 3 |
| 15× | 15$v_T$ | 1/15 | 1/30 | 2 |
| 30× | 30$v_T$ | 1/30 | 1/30 | 1 |

Further, using the Y-interval double-frame method (FIG. 4), variable-speed reproduction at the speeds shown in the below Table 2 is possible.

TABLE 2

| Speed multiple | Tape speed (mm/s) | Write time (in seconds) | Read time (in seconds) | Number of read repetitions |
|---|---|---|---|---|
| 1× | $v_T$ | 1/2 | 1/30 | 15 |
| 3× | 3$v_T$ | 1/6 | 1/30 | 5 |
| 5× | 5$v_T$ | 1/10 | 1/30 | 3 |
| 15× | 15$v_T$ | 1/30 | 1/30 | 1 |

Thus, when performing the m-times speed in the Y-interval m-frame method, the tape is travelled at a speed of n×$v_T$. The memory write time is (1/mn)th of a second and the number of read repetitions is 30×(1/mm).

As described above, the present invention records the data for the normal recording and reproduction and that for the special recording and reproduction separately, on mutually different regions of the magnetic tape in a digital VTR. Accordingly, since the processing of the normal recording/reproduction signal is independent from that of the special recording/reproduction signal, the normal-processing design is facilitated with a higher degree of freedom. Also, the special-processing design is possible using general-purpose VTR technology without the need for high-precision servo technology and without the use of special materials and/or components.

Figure 11:
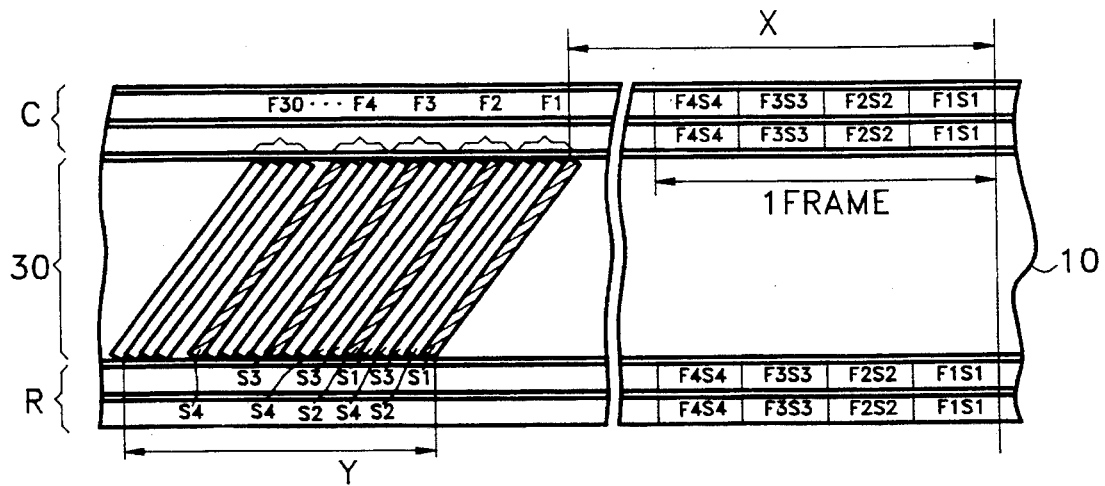
FIG. 11 is a recording pattern diagram of a magnetic tape according to yet another embodiment of the present invention.

In the present invention, a method for making every Nth frame of data recorded on the second region correspond to every Nth frame of normal recording has been illustrated. However, as shown in FIG. 11, the data is partly extracted from a plurality of frames of the normal recording. In this manner, every Nth frame of data recorded on the second region can be constituted. That is, in the case of a single-frame four-segment four-track method, the Y-interval is divided into four segments, so that a first segment S1 of first frame F1, a second segment S2 of second frame F2, a third segment S3 of third frame F3 and a fourth segment S4 of fourth frame F4 can be sequentially recorded. Therefore, in the case of the Y-interval single-frame method, the Y-interval is divided into thirty segments. The data partially extracted from each of the thirty frames can be respectively recorded on the divided segments.

What is claimed is:

1. A digital video recording and reproducing method comprising the steps of:

reserving a first region of a magnetic tape;

helically scanning said first region of the magnetic tape while the magnetic tape is running at a normal speed to record a digital data train on a plurality of sloped tacks;

simultaneously with said scanning step recording single frame data at an interval of N pictures on a second region of the magnetic tape, the second region being different from the first region;

reproducing the data recorded only on the first region during a normal reproduction; and reproducing the data recorded on the second region while the magnetic tape runs at an N-times speed for a variable speed reproduction.

2. The digital video signal recording and reproducing method according to claim 1, wherein said digital data train recorded on said first region is separately recorded on M sloped tracks for every frame.

3. The digital video signal recording and reproducing method according to claim 2, wherein said single frame data is recorded on at least one horizontal track within an interval through which said magnetic tape is travelled when the Nth to (2N-1)th frame data is recorded on said first region.

4. The digital video signal recording and reproducing method according to claim 3, wherein said travelled distance (Y) is expressed as $$Y = \frac{P}{\sin\theta} \times M \times N$$

, and wherein P represents a pitch of the sloped track, and θ represents an angle of inclination.

5. The digital video signal recording and reproducing method according to claim 1, wherein said digital data train recorded on said first region has a bit rate fixed in units of N frames.

6. The digital video signal recording and reproducing method according to claim 3, wherein said every Nth frame data recorded on said second region has a bit rate fixed in units of a frame.

7. The digital video signal recording and reproducing method according to claim 3, wherein a data compression ratio (CP) is expressed as $$CP = \frac{(B+C)\lambda}{2Hv_T}$$

, wherein B represents a bit amount of said every Nth frame data recorded on said second region, H represents a number of fixed heads used in said recording step, C represents a parity bit amount, λ represents a recording wavelength of the fixed heads, and a relative velocity between the fixed head and the tape is represented by $v_T$.

8. The digital video signal recording and reproducing method according to claim 1, wherein there are four fixed heads.

9. The digital video signal recording and reproducing method according to claim 1, wherein said single frame data to be recorded on said second region is obtained by SIF-sub-sampling an original picture data.

10. The digital signal recording and reproducing method according to claim 9, wherein said single frame data reproduced during the variable reproduction is interpolated and displayed into a size of an original picture.

11. The digital video signal recording and reproducing method according to claim 9, wherein said single frame data reproduced during the variable reproduction is displayed into a size of a sub-sampled picture.

12. The digital video signal recording and reproducing method according to claim 1, wherein said single frame data reproducing during the variable speed reproduction is recorded in a frame memory at a recording rate of 1/mn, and said recorded data is repetitively reproduced by an integer representing the value of 30×(1/mn) per second, in which n represents the number of frames recorded on a horizontal track per unit of time and m represents a speed multiple.

13. A digital video recording and reproducing method comprising the steps of:

helically scanning a first region of a magnetic tape running at a normal speed;

recording a digital data train of a plurality of frames per second on a plurality of sloped tracks, and simultaneously picking up the digital data from at least one frame among said plurality of frames;

recording said at least one frame of a digital data train formed of the picked-up digital data on at least one horizontal track in a second region of the magnetic tape through at least one fixed head, the second region being different from the first region; and reproducing the data recorded on the first region during a normal reproduction, while the magnetic tape runs at a predetermined multiple speed during a variable speed reproduction, to reproduce the data recorded on the second region.

14. A digital video recording and reproducing apparatus comprising:

a plurality of rotary heads for helically scanning a first region of a magnetic tape at a predetermined rotation speed;

a plurality of fixed heads for lengthwise scanning a second region of the magnetic tape which is different from the first region;

a normal recording portion which receives a digital audio/video signal, performs high efficiency encoding, error correction encoding and a channel encoding of the received signal, and supplies the encoded signal to the plurality of rotary heads;

a variable speed recording portion which receives as an input signal every Nth frame of the digital video signal input to the normal recording portion, performs subsampling, high-efficiency encoding and channel division of the input signal, performs error correction encoding and channel encoding of the respective divided channel signals and supplies the thus-processed signal to the corresponding fixed heads;

a normal reproduction portion which processes the signals picked-up from the first region of the magnetic tape via the plurality of rotary heads in a reverse manner as that of the normal recording portion and restores the processed signals into original normal reproduction signals, during the normal reproduction; and a variable speed reproduction portion which processes the signals picked-up from the second region of the magnetic tape via the plurality of the fixed heads in a reverse manner as that of the variable speed recording portion and restores the processed signals into original signals corresponding to the input signal, during the variable speed reproduction.

15. The digital video recording and reproducing apparatus according to claim 14, wherein said variable speed recording portion comprises a source input format (SIF) sub-sampler for sub-sampling the input signal.

16. The digital video recording and reproducing apparatus according to claim 14, wherein said tape is half-loaded to a fixed head during the variable speed reproduction.

17. The digital video recording and reproducing apparatus according to claim 15, wherein said variable speed reproduction portion comprises an interpolator for restoring the SIF-subsampled signal into the size of the original picture.

18. The digital video recording and reproducing apparatus according to claim 14, wherein said variable speed reproduction portion further comprises video output means which records the restored signal in a frame memory at a recording rate of 1/mn, and the written signal is repetitively read by an integer multiple representing the value of 30×(1/mn) per second, in which n represents the number of frames recorded on a horizontal track per unit of time, and m represents a speed multiple.

19. The digital video recording and reproducing apparatus according to claim 18, wherein said video output means comprises:

an input switch for switching the restored signal in units of a frame;

a pair of frame memories on which the frame-unit restored signal supplied via said input switch is written at said recording rate and from which the written signal is read by said integer multiple value, said pair of frame memories operating alternately with respect to each other; and an output switch for operating in units of a frame in the opposite manner of said input switch, so as to alternately output the signals read from said pair of frame memories.

20. The digital video recording and reproducing method according to claim 13, wherein said plurality of frames is 30 frames.

* * * * *